(12) United States Patent
Fehr (10) Patent No.: US 8,336,795 B2
(45) Date of Patent: *Dec. 25, 2012

(54) SILAGE PILE DEFACER

(75) Inventor: Gary Fehr, Morris, MN (US)

(73) Assignee: Riverview, LLP, Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,634

(22) Filed: Sep. 6, 2011

(65) Prior Publication Data

US 2012/0001004 A1    Jan. 5, 2012

Related U.S. Application Data

(63) Continuation of application No. 12/584,873, filed on Sep. 14, 2009, now Pat. No. 8,011,608, which is a continuation-in-part of application No. 11/818,371, filed on Jun. 14, 2007, now Pat. No. 7,588,203.

(51) Int. Cl.
    *B02C 19/00* (2006.01)

(52) U.S. Cl. .................................. 241/101.72; 241/605

(58) Field of Classification Search ............. 241/101.72, 241/605
    See application file for complete search history.

(56) References Cited

U.S. PATENT DOCUMENTS 5,355,918 A * 10/1994 Lang .......................... 144/24.12
8,011,608 B2 * 9/2011 Fehr .......................... 241/101.72

* cited by examiner

*Primary Examiner* — Mark Rosenbaum
(74) *Attorney, Agent, or Firm* — Dicke, Billig & Czaja, PLLC (57) ABSTRACT

A silage pile defacer includes a frame having a rear end and a front end. A transverse beam carrying a plurality of downwardly projecting tines is coupled to the front end of the frame. A quick connect coupler is mounted to the rear end of the frame for mounting the defacer to a quick hitch coupler on the lift arm mechanism of a tractor. The tines are oriented at an angle relative to the frame, allowing the tines to be generally vertically oriented relative to the ground when the defacer is elevated above a silage pile. The tines of the defacer are configured to contact the silage pile and to skive off a face layer of the silage pile when the defacer is lowered to the ground by the tractor lift arm mechanism.

9 Claims, 9 Drawing Sheets

SILAGE PILE DEFACER

CROSS-REFERENCE TO RELATED APPLICATION

This is a continuation of U.S. patent application Ser. No. 12/584,873, filed Sep. 14, 2009, now U.S. Pat. No. 8,011,608, which is a continuation-in-part of U.S. patent application Ser. No. 11/818,371, filed Jun. 14, 2007, now U.S. Pat. No. 7,588,203.

BACKGROUND

The present invention generally relates to silage pile defacers. Silage is typically stored on the ground in a large pile. The silage pile is usually covered with a plastic sheet to minimize air and moisture exposure to the pile, which prevents spoilage of the silage. One end of the pile is uncovered for removal of a daily feeding volume of silage. A generally vertical layer of silage is removed from the exposed face of the pile to form a feed pile at the base of the silage pile. Typically, a front end loader or similar implement is employed to scoop up the feed pile for delivery to livestock.

Known silage pile defacers comprise a hydraulically actuated rotating cylinder with radially extending teeth carried on a tractor-mounted implement. The implement is maneuvered to draw the rotating cylinder along a vertical face of the silage pile to remove a layer of the silage. The known silage pile defacers necessitate frequent maintenance to repair/replace worn parts. The teeth of the rotating cylinder of the known silage pile defacers also grind the silage as it removes the silage from the pile, which creates silage "fines." Excess silage fines are undesirable in feed for dairy cows.

The present invention provides an improved silage pile defacer with no moving parts that does not grind the silage.

SUMMARY

A silage pile defacer comprises a frame, a transverse beam coupled to the frame, and a plurality of metal plates connected to the transverse beam. The frame has a first end and a second end opposite the first end. The first end of the frame comprises means to reversible couple the frame with a quick connect lift arm mechanism of a tractor. The transverse beam is coupled to the second end of the frame. The transverse beam has a length, a front surface, an upper surface and a lower surface. The plurality of metal plates are spaced along the length of the transverse beam. Each metal plate of the plurality of metal plates has a length defined by a first end and a second end opposite the first end. The first end of each metal plate is connected to the transverse beam, and the second end of each metal plate is spaced from the lower surface of the transverse beam.

DETAILED DESCRIPTION

Figure 1:
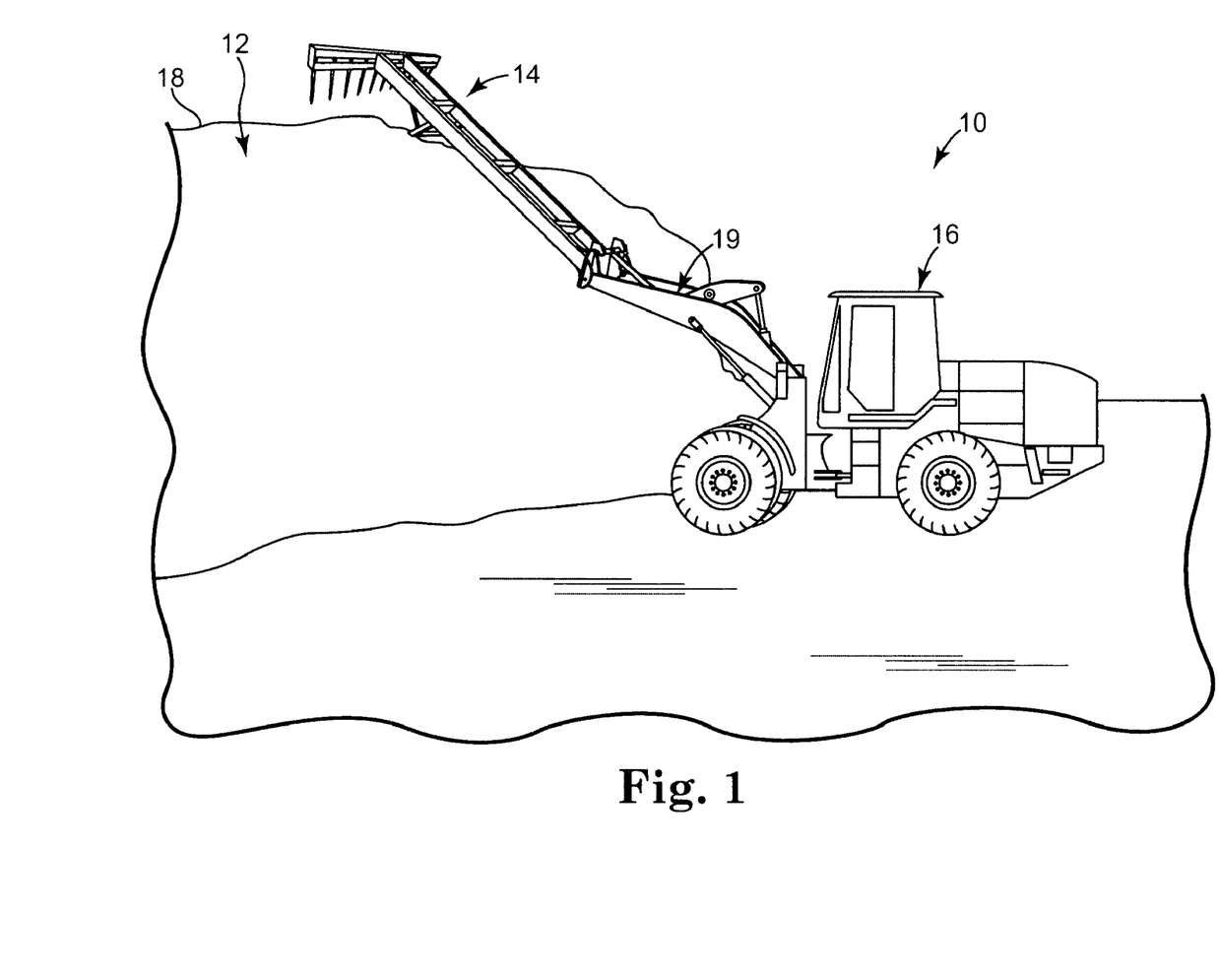
FIG. 1 is a perspective view of one embodiment of a silage pile defacer of the present invention mounted on a tractor and positioned above a silage pile.

FIG. 1 is a perspective view of a silage pile defacer assembly 10 positioned to remove a layer of silage from a silage pile 12 according to one embodiment. Assembly 10 generally includes a silage pile defacer 14 coupled to a lift arm mechanism 19 of a tractor 16. Tractor 16 is employed to elevate defacer 14 above a top side 18 of the silage pile 12. Through the coordinated movement of a lifting arm mechanism 19 of tractor 16, defacer 14 is able to remove a generally vertical layer of silage from a face of pile 12.

Figure 2:
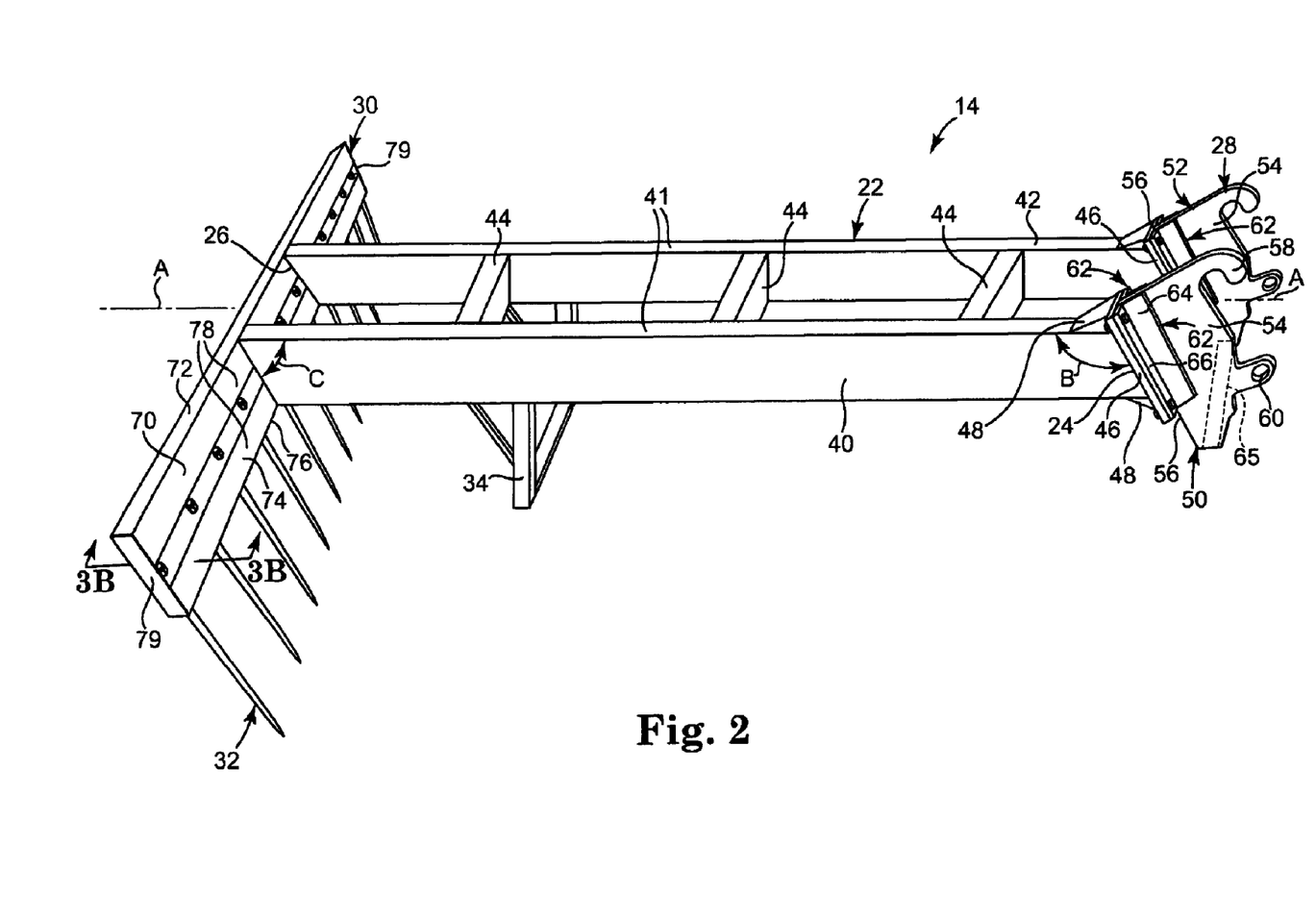
FIG. 2 is a side perspective view of one embodiment of the silage pile defacer of the present invention.

FIG. 2 is a side perspective view of one embodiment of the silage pile defacer 14 of the present invention. Silage pile defacer 14 generally includes a frame 22 having a rear end 24 and a front end 26, a quick attach mount 28 coupled to rear end 24, and a transverse beam assembly 30 coupled to front end 26 of frame 22. Transverse beam assembly 30 includes a plurality of tines 32 spaced along the length of beam assembly 30, which extend generally downward from transverse beam assembly 30. When defacer 14 is disconnected from tractor 16, transverse beam assembly 30 is supported above the ground by a base 34 connected to a lower surface of frame 22. Silage pile defacer 14 is generally fabricated from metal, e.g., steel, suited for use with powered farm implements.

In one exemplary embodiment, frame 22 includes a first elongate metal beam 40, a second elongate metal beam 42 that is spaced from and generally parallel to first beam 40 and a plurality of lateral braces 44 spaced relative to on another and coupled between facing outer surfaces of first and second beams 40, 42. By way of example, in one embodiment metal beams 40 and 42 each have a length of about 17 feet and are spaced apart by about 29 inches. The number and placement of lateral braces 44 may vary depending upon a selected overall length of defacer 14. In one embodiment, three lateral braces 44 are generally equally spaced apart between rear end 24 and front end 26 and are secured to beams 40 and 42 by welding. Each beam 40, 42 has a front end surface at front end 26. In one embodiment, front ends 26 are formed at an acute angle C as measured from upper surface 41 of beams 40, 42. Alternatively, front ends 26 may be formed at an angle selected from a range that is greater than or less than 90 degrees relative to the upper surface 41 of beams 40, 42. Each beam 40, 42 further has a rear end surface at rear end 24. In one embodiment, rear ends 24 are formed at an obtuse angle B as measured from upper surface 41 of beams 40, 42. In one embodiment, the angle B is an obtuse angle between about 95-150 degrees, and preferably the angle B is between about 110-135 degrees. In one embodiment, the angle C is an acute angle between about 40-85 degrees, and preferably the angle C is between about 65-75 degrees.

In one embodiment, connected to each rear end surface of beams 40, 42 is a metal plate 46, which provides a mounting surface for quick attach mount 28. Metal plate 46 is a generally rectangular plate having a height and width greater than that of the rear end surface of beams 40, 42. In one embodiment, plates 46 are secured to beams 40, 42 by welding. Top and bottom portions of plates 46 are reinforced by wedge-shaped metal gussets 48 that are welded to beams 40, 42 and plates 46.

In general, quick attach mount 28 includes a first hanger 50 and a second hanger 52. First and second hangers 50, 52 each comprise a metal plate 54 having a straight front edge 56 that abuts plate 46 and a rear edge configured to define a hook 58 at an upper extent of plate 54 and an eye 60 spaced from and below hook 58. Hooks 58 and eyes 60 of metal plates 54 cooperate with a quick hitch coupler provided on a lift mechanism of a tractor, front end loader, or the like. Each plate 54 includes mounting flanges 62 on opposite sides adjacent to front edge 56. Flanges 62 comprise a length of angle iron having one leg 64 welded to plate 54 and the adjoining leg 66 flush with front edge 56. Hangers 50, 52 are secured to metal plates 46 by welding or bolting flanges 66 to plates 46. In one embodiment, hangers 50, 52 are braced together by a brace 65 connected between lower edges of plates 54.

In one embodiment, transverse beam assembly 30 includes an upper transverse beam member 70 that defines an upper surface 72 of transverse beam 30, and a lower transverse beam member 74 spaced from beam member 70 that defines a lower surface 76 of transverse beam 30. Transverse beam assembly 30 has a length substantially greater than the width of frame 22, with beam assembly 30 being generally centered relative to a longitudinal axis A of frame 22. In one embodiment, transverse beam assembly 30 has a length of about 10 feet. Rear facing surfaces 78 of transverse beams 70, 72 are connected to the front end surfaces of beams 40, 42, e.g. by welding. End portions of transverse beam members 70, 74 are connected by end plates 79 welded to beams 70, 74.

Tines 32 are located along and connected to transverse beam member 74 in a spaced relationship relative to one another. In one embodiment, tines 32 have a spacing of about 10.5 inches on center. Tines 32 extend from lower surface 76 in a generally downward direction. In one embodiment, tines 32 are solid steel bale tines having a length of about 32 inches and an outer diameter of about 1 inch.

Figure 3A:
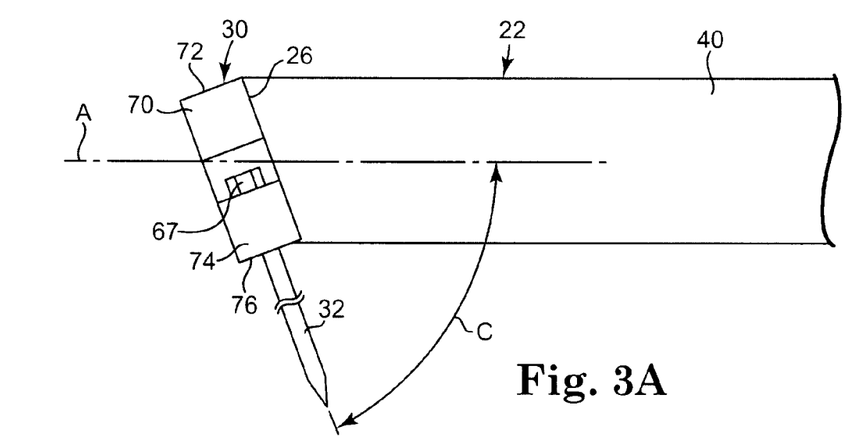
FIG. 3A is a partial side view of a front end of the silage pile defacer of FIG. 2.

FIG. 3A is a partial side view of front end 26 of the silage pile defacer 14 of FIG. 2 with end plate 79 removed. In general, tines 32 extend away from lower surface 76 of transverse beam member 74 generally perpendicular to lower surface 76. Relative to beams 40, 42, tines extend at the acute angle C as shown, in a direction toward the rear end 24 of frame 22.

Figure 3B:
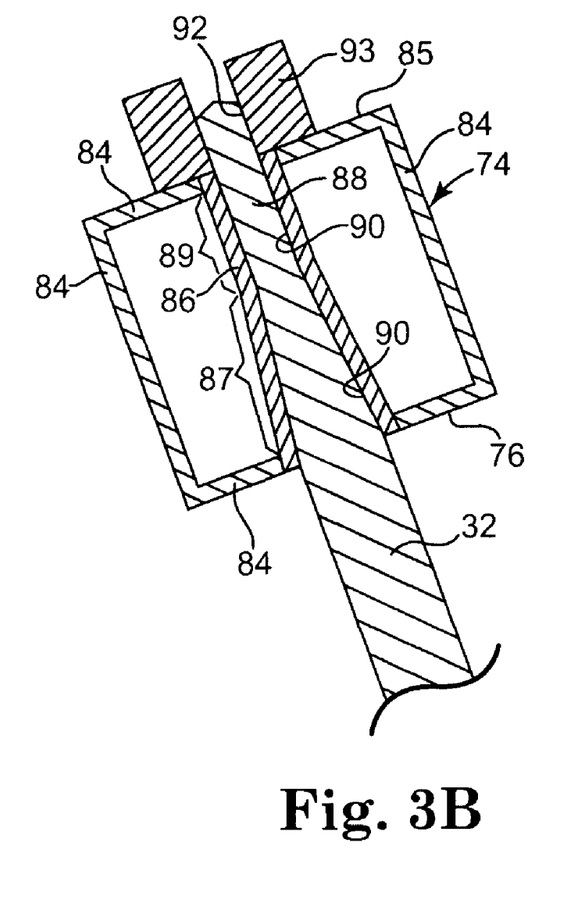
FIG. 3B is a cross-sectional view of a portion of a transverse beam and a tine coupled to the transverse beam taken along line 3B-3B of FIG. 2.

FIG. 3B is a cross-sectional view of a portion of transverse beam member 74 and tine 32 taken along line 3B-3B of FIG. 2. In one embodiment, second transverse beam member 74 is a box beam having four walls defining sides 84. Upper surface 85 and lower surface 76 of beam member 74 are provided with pairs of openings in which is secured a sleeve 86, such as by welding. The opening in lower surface 76 is larger than the opening in upper surface 85. Sleeve 86 has a first portion 87 extending from lower surface 76 defined by a radially tapered inner diameter and a second portion 89 which extends to upper surface 85 at a constant inner diameter defined relative to the opening in upper surface 85. Sleeve 86 is configured to receive an end 88 of tine 32 having an outer surface 90 configured complimentary to the inner diameter of portions 87, 89 of sleeve 86. An end portion 92 of tine 32 is machined with external threads. Tine 32 is connected to beam member 74 by inserting tine 32 into sleeve 86 until the relative surfaces of tine 32 and sleeve 36 mate and an end portion 92 of tine 32 extends beyond upper surface 85 of beam member 74. Tine 32 is retained within sleeve 36 by a nut 93 threaded onto end portion 92 of tine 32. In this manner, tine 32 is securely bolted to transverse beam member 74, but is removable for maintenance and/or replacement.

Figure 4:
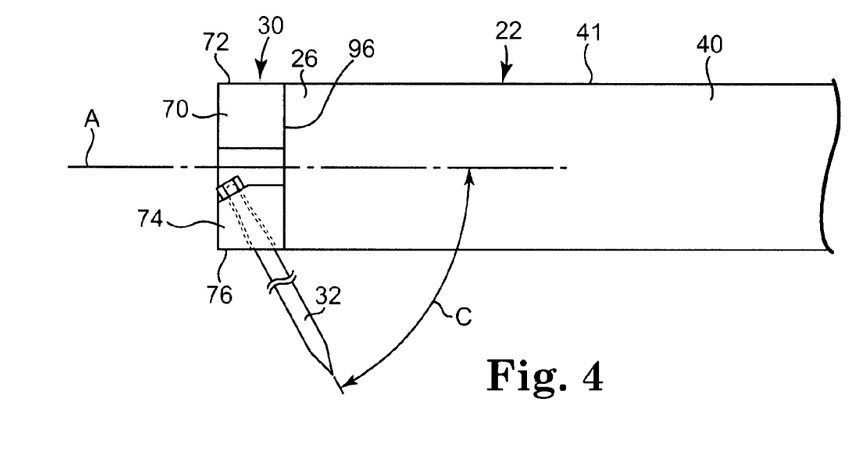
FIG. 4 is a partial side view of a front end of a second embodiment of a silage pile defacer of the present invention.

FIG. 4 is a partial side view of a front end of a second embodiment of a silage pile defacer 14 of the present invention. As shown in FIG. 4, a front surface 96 of beam 40 is generally perpendicular to upper surface 41 of beam 40. Transverse beam assembly 30 is connected to front surface 96. A sleeve similar to sleeve 86 is inserted and connected between openings located generally near opposite corners of beam member 74 at an acute angle C to permit tines 32 to extend away from lower surface 66 of transverse beam 30 at the acute angle C as measured from the longitudinal axis A of beam 40. In one embodiment, tines 32 are inserted into a sleeve formed in transverse beam member 74 in a manner similar to that described in FIG. 3B above. Alternatively, tines 32 are welded to transverse beam member 64.

Figure 5:
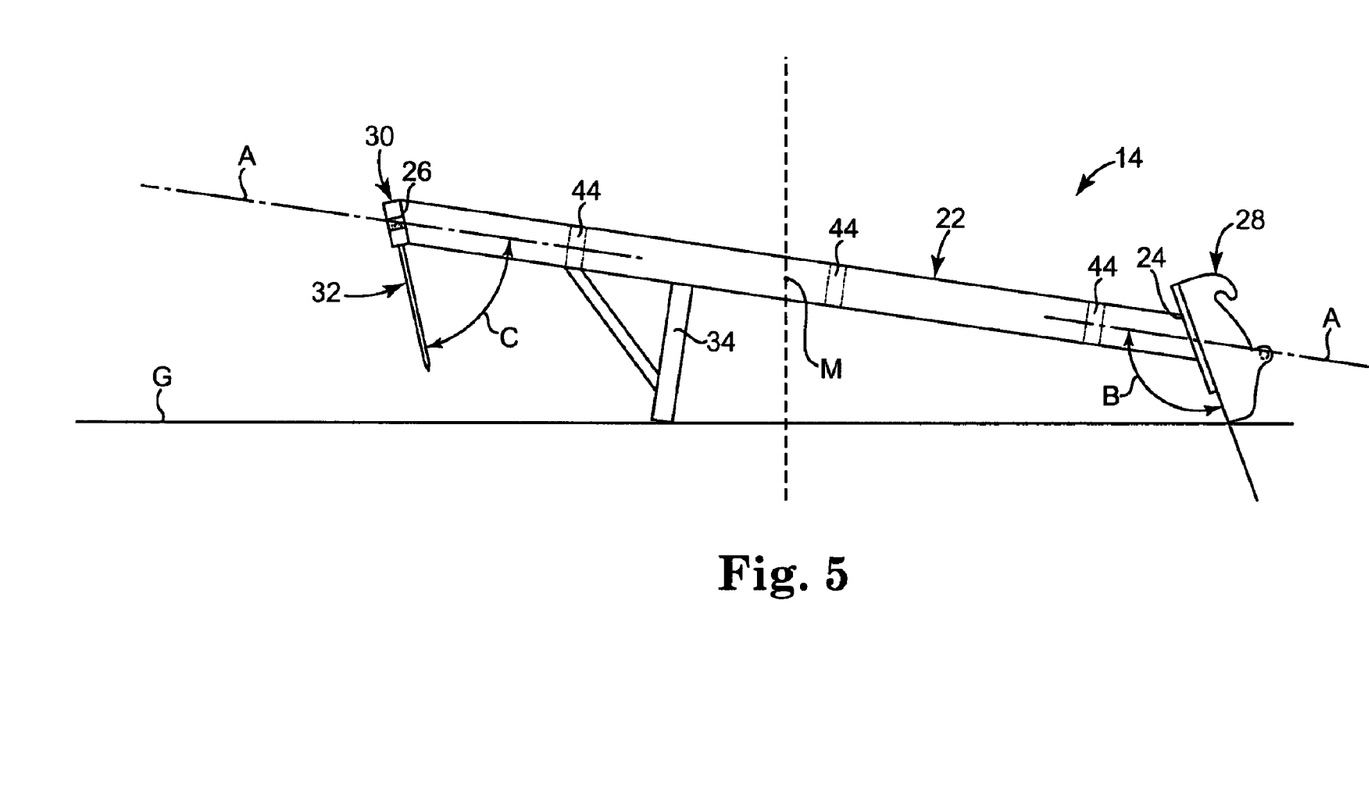
FIG. 5 is an exploded partial perspective view of a front end of a third embodiment of a silage pile defacer of the present invention.

FIG. 5 is a side view of the silage pile defacer 14 shown in FIG. 2 resting on the ground G. Quick attach mount 28 and base 34 contact ground G, and tines 32 are elevated off of the ground G. Base 34 is coupled to frame 22 between a center of mass M of defacer 14 and front end 26, such that quick attach mount 28 is imbalanced to naturally tilt to the ground G.

Quick attach mount 28 is coupled to rear end 24 of frame 22 at angle B, and tines 32 and transverse beam 30 at the angle C. The angle B is different from the angle C and is selected to facilitate hitching a quick hitch coupler of a tractor lift arm mechanism to an at-rest quick attach mount 28. One suitable example provides an angle B of about 110 degrees. The angle C can vary depending upon the size of the silage pile 12 and/or the size of the tractor 16 employed to lift defacer 14. One suitable example provides an angle C of about 80 degrees. The angles B and C are selected to orient tines 32 to be generally perpendicular to the ground when front end 26 of defacer 14 is elevated above the top surface 18 of the silage pile 12 (FIG. 1).

Figure 6:
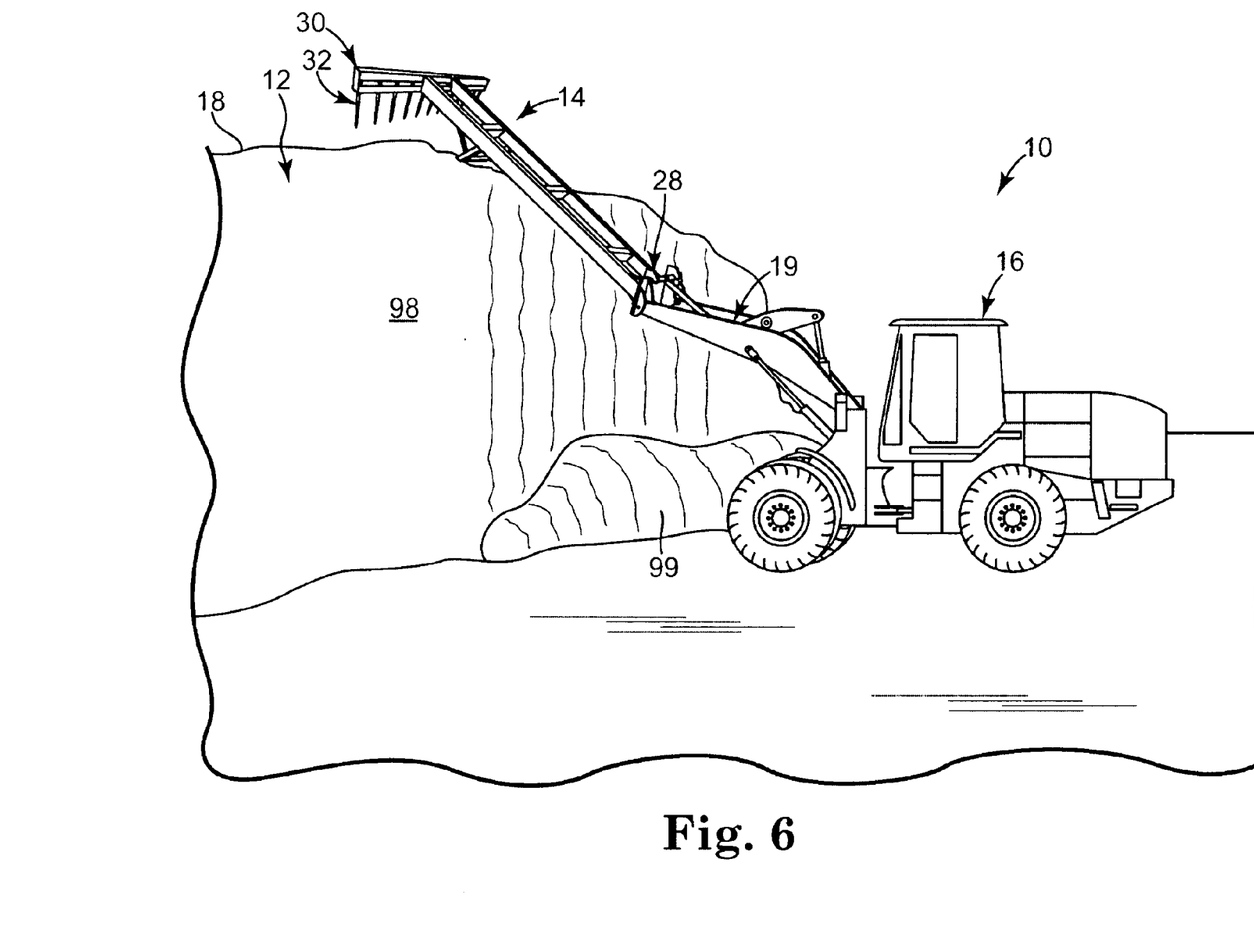
FIG. 6 is a side view of the silage pile defacer shown in FIG. 2 resting on the ground and ready for attachment to an implement.

FIG. 6 is a perspective view of defacer 14 coupled to a hydraulically actuated lift arm mechanism 19 of a tractor 16. To deface a layer of silage from silage pile 12, tractor 16 is maneuvered with defacer 14 oriented generally perpendicular to face 98 of silage pile 12. Lift arm mechanism 19 is then actuated to elevate defacer 14 above silage pile 12 with tines 32 generally perpendicular to the ground. Tines are positioned to contact silage pile 12 about 1 foot away from face 98. The lift arm mechanism 19 is then actuated to lower defacer 14 toward the ground with tines 32 thus skiving a layer of silage from the face 98 of pile 12. Tractor 16 is then repositioned along face 98 to the next adjacent portion of silage pile 12 to skive the next adjacent layer of silage from pile 12.

Tines 32 extend away from transverse beam 30 at the angle C (FIG. 3A), such that when silage pile defacer 14 is elevated above the silage pile 12, tines 32 are oriented generally vertically to the ground and configured to engage with the top 18 of pile 12. An operator of tractor 16 having an ordinary level of skill in operating farm equipment is able to operate lift arm mechanism 19 to rake tines 32 downward along a face 98 of the silage pile 12 to form a mound 99 of silage feed. The mound 99 of feed is formed by a suitable number of swipes of silage pile defacer 14 along face 98, after which the silage feed is transported to a feeding trough or other area.

The silage in pile 12 is densely packed due to the pile 12 settling under the force of gravity over the course of weeks or months. The combination of angles B and C of support strut 22 (FIG. 2) enable assembly 10 to skive a near vertical face 214 on silage pile 12. Alternatively, assembly 10 is operable to skive an inclined face on the silage pile 12, depending upon the operator's manipulation of lift arm mechanism 19. However, a more vertical face 98 is generally desired to minimize erosion of the pile 12.

Figure 7:
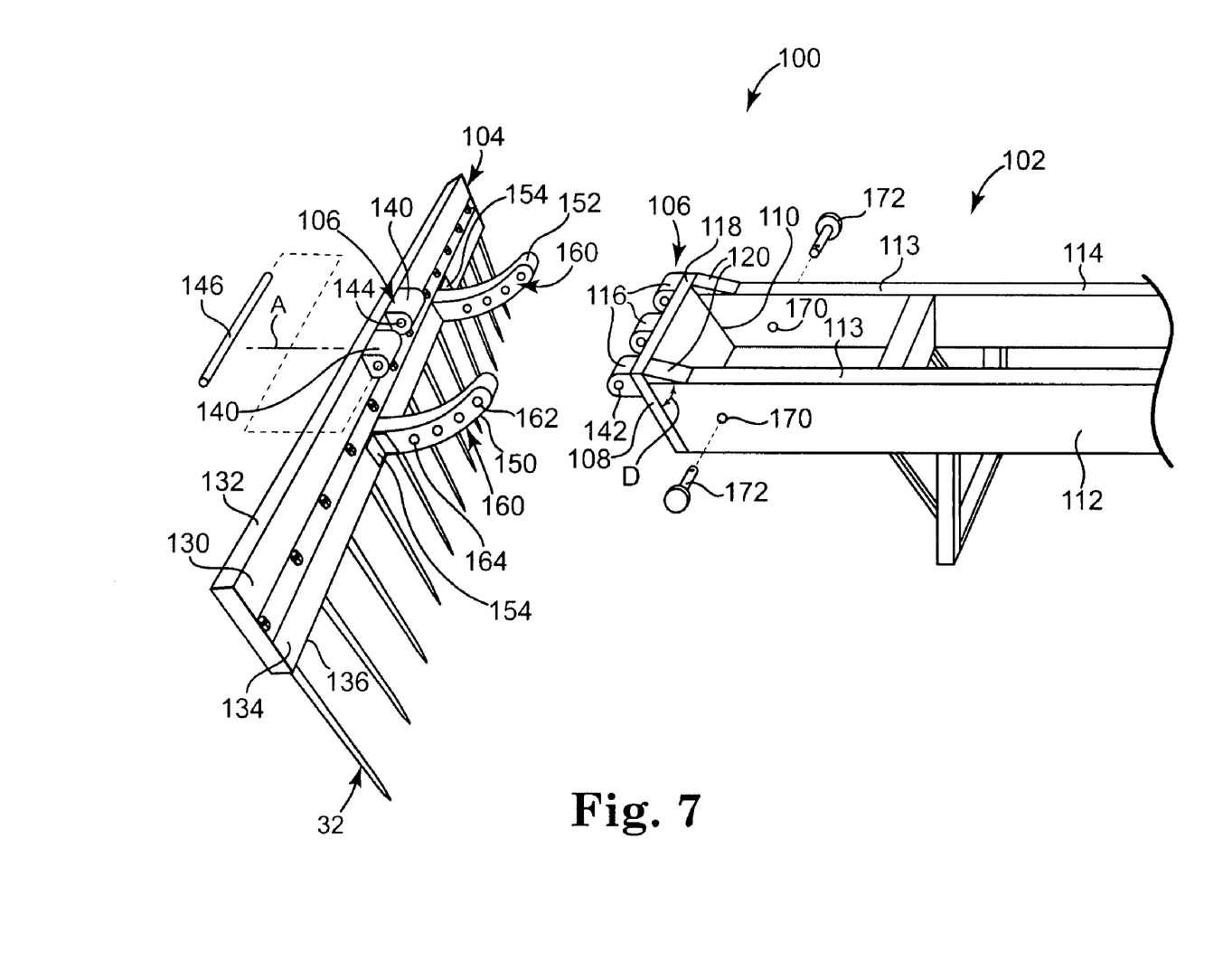
FIG. 7 is a perspective view of the silage pile defacer assembly shown in FIG. 1 defacing a layer of silage from the silage pile.

FIG. 7 is an exploded perspective view of a third embodiment of silage pile defacer 100 comprising a frame 102 and an adjustable angle transverse beam 104 mounted to frame 102 by a hinge assembly 106 according to one embodiment. Embodiments provide for selectively tilting transverse beam 104 relative to frame 102 via hinge assembly 106 to achieve a desired angle of tines 32 relative to frame 102. The adjustability provided by hinge assembly 106 enables the selective angular positioning of tines 32 to accommodate various sizes of tractors used to lift defacer 100.

In general, the rear end of frame 102 is similar to rear end 24 of frame 22 (FIG. 2) and includes a quick attach mount (not shown, but similar to quick attach mount 28 of FIG. 2). Front end 110 of frame 102 includes a hinge mounting plate 108 that is coupled to the angled front facing surfaces of beams 112, 114 of frame 102, which are formed at an angle D relative to upper surface 113 of beams 112, 114. In one embodiment, hinge mounting plate 108 is welded to the front facing surfaces of beams 112, 114 and a gusset 120 is welded between each beam 112, 114 and top end 118 of hinge mounting plate 108. The angle D defines the largest incline for transverse beam 104 (i.e., the greatest amount of angled rake for tines 32 relative to axis A). An exemplary range for the angle D suited to accommodate most tractors to which defacer 100 is attached is between about 20-50 degrees. Mounted at a top end of hinge mounting plate 108 are spaced hinge sleeves 116.

Transverse beam 104 includes an upper transverse beam member 130 that defines an upper surface 132 of transverse beam 104, and a lower transverse beam member 134 that defines a lower surface 136 of transverse beam 104. Tines 32 extend from the lower transverse beam member 134 in the manner previously described relative to transverse beam 30.

With the above in mind, hinge assembly 106 includes a pair of hubs 140 coupled to upper transverse beam member 130 that rotatably engage with sleeves 116 of hinge mounting plate 108. Sleeves 116 and hubs 140 each define bores 142, 144, respectively, and are configured to receive an axel 146 that is insertable through bores 142, 144. The number of sleeves 116 and hubs 140 is not critical and can vary depending upon a length of transverse beam 104. For example, two hubs 140 are provided that mesh with three sleeves 116 (as shown), but other embodiments can include three hubs 140 that mesh with four loops 116, for example.

When hinge assembly 106 is operably coupled, axel 146 is inserted through bores 142, 144 to enable hubs 140 to rotate relative to sleeves 116. In this manner, transverse beam 104 is configured to adjustably rotate relative to frame 102 such that tines 32 are rotatable through a range of angles from about 90 degrees, where tines 32 are substantially perpendicular to frame 102, to the acute angle D. Means are provided to selectively fix the adjustable transverse beam 104 relative to frame 102 when the desired angle of transverse beam 104 is achieved.

In one embodiment, transverse beam 104 includes a first arm 150 spaced from a second arm 152, where arms 150, 152 are coupled to upper transverse beam member 134 and configured to engage with frame 102. In one embodiment, a corner support 154 is welded between upper transverse beam member 134 and each arm 150, 152. In general, arms 150, 152 are spaced apart by a distance that enables arms 150, 152 to straddle second end 110 of frame 102. In this manner, when assembled, transverse beam 104 rotates relative to frame 102 about hinge assembly 106, and arms 150, 152 slide along outward facing sides of beams 112, 114.

Arms 150, 152 are fabricated to include an indexed series of holes 160 including a first hole 162 spaced from a last hole 164. Beams 112, 114 are provided with bores 170 near front end 110. Holes 160 of each arm 150, 152 align with bores 170 formed in a lateral side of beams 112, 114, which allows tines 32 to extend at an angle ranging from about 90 degrees relative to central longitudinal axis A to the angle D.

A pin 172 is provided that is configured to engage with one of the indexed holes 160 and bore 170 to selectively retain transverse beam 104 (and tines 32) at the desired angle relative to axis A. Pin 172 includes spring-loaded pins, or pins configured to receive a cotter pin, or other pins suitably styled to retain arms 150, 152 in a desired position against beams 112, 114, respectively.

In general, the angle D is an acute angle selected to be in the range of about 20-50 degrees, preferably the angle D is about 35 degrees. For larger tractors and large silage piles (of over about 20 feet in height, for example), arms 150, 152 are pinned relative to frame 102 such that first hole 162 is aligned with bore 170 and tines 32 extend at an angle approaching about 90 degrees to central longitudinal axis A. Conversely, for smaller tractors such as skid steers, arms 150, 152 are pinned relative to frame 102 such that last hole 164 is aligned with bore 170 and tines 32 extend at the steepest angle, which is about at the angle D. In this manner, both large and small tractor sizes are accommodated by the adjustable transverse beam 104 that enable tines 32 to be substantially perpendicular to a top of a silage pile when the defacer 100 is elevated above the silage pile, regardless of tractor or silage pile size.

Figure 8:
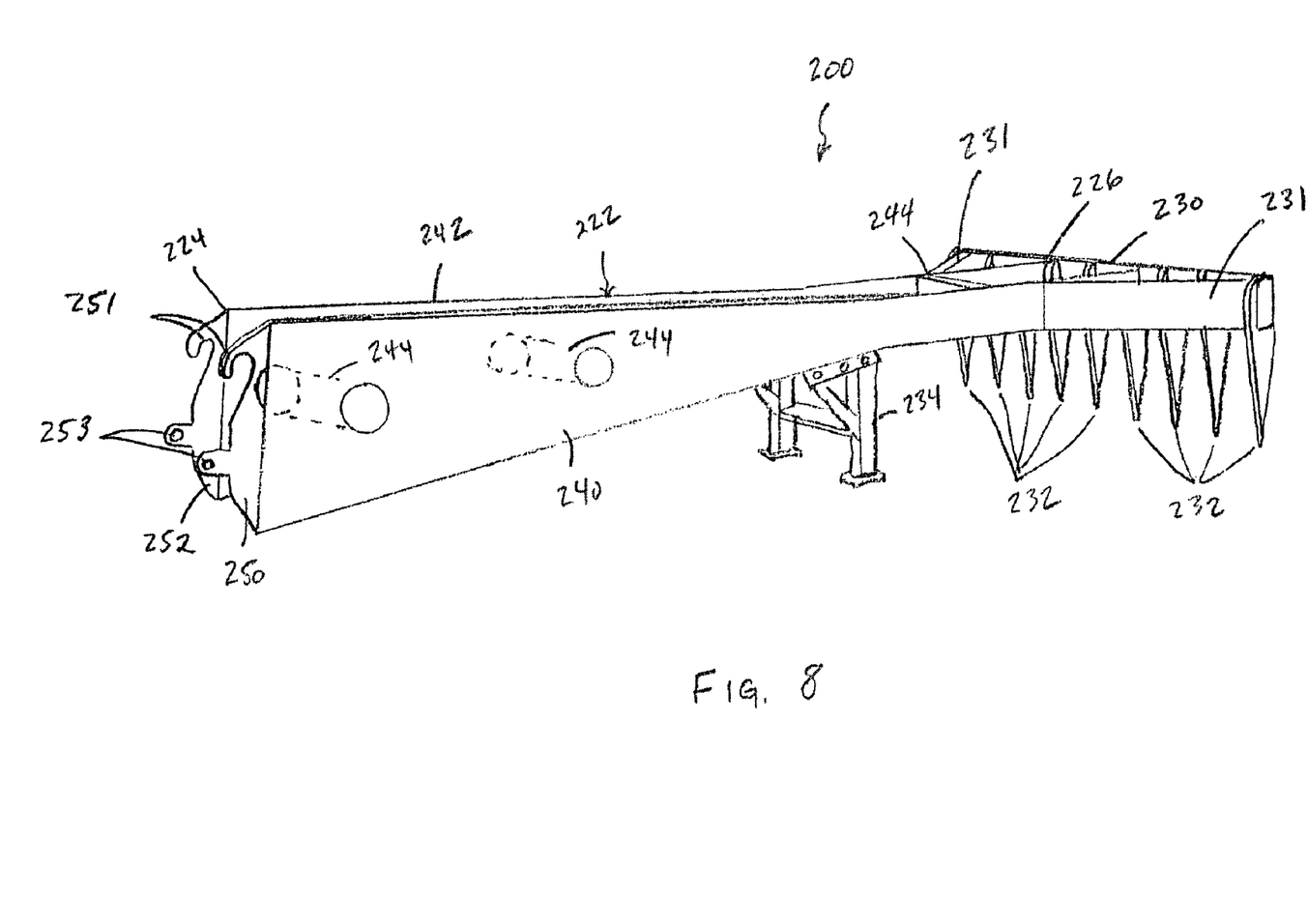
FIG. 8 is a perspective view of a fourth embodiment of a silage pile defacer of the present invention.

FIG. 8 is a perspective view of a fourth embodiment of a silage pile defacer 200 of the present invention. Defacer 200 is similar in general construction to defacer 14. Defacer 200 generally includes a frame 222 having a rear end 224 and a front end 226, a quick attach mount 228 coupled to rear end 224, and a transverse beam 230 coupled to front end 226 of frame 222. Transverse beam 230 includes a plurality of tines 232 spaced along the length of beam 230, which extend generally downward from transverse beam 230. When the defacer 200 is not in use, the transverse beam assembly 230 is supported above the ground by a base 234 connected to a lower surface of frame 222.

Frame 222 includes a first elongate metal beam 240, a second elongate metal beam 242 that is spaced from and generally parallel to first beam 240 and a plurality of lateral braces 244 spaced relative to one another and coupled between facing outer surfaces of first and second beams 240, 242. Other suitable constructions for frame 222 are also acceptable, including frames having a single elongate metal beam and frames having more than two elongate metal beams. As shown in FIG. 8, each beam 240, 242 has a greater width at rear end 224 as compared front end 226, the width of each beam tapering from rear end 224 generally to the point of attachment of base 234.

Attached to the rear end 224 of each beam 240, 242 are hangers 250, 252, respectively, which are similar in construction to hangers 50, 52 of the embodiment shown in FIG. 1. Each hanger 250, 252 is configured with a hook 251 having a first spacing from rear end 224, and an eye 253 having a second spacing, greater than the first spacing, relative to rear end 224. The spacing differential between hooks 251 and eyes 253 defines an obtuse angular configuration of hangers 250, 252 at rear end 224 that facilitates connection to a quick hitch coupler of a tractor lift arm mechanism without having to form the rear ends 224 of beams 240, 242 at an obtuse angle as disclosed relative to defacer 14. Hangers 250, 252 each have a length generally equal to the width of beams 240, 242 at rear end 224 such that hangers 250, 252 are supported completely on the end surfaces of beams 240, 242.

Figure 8A:
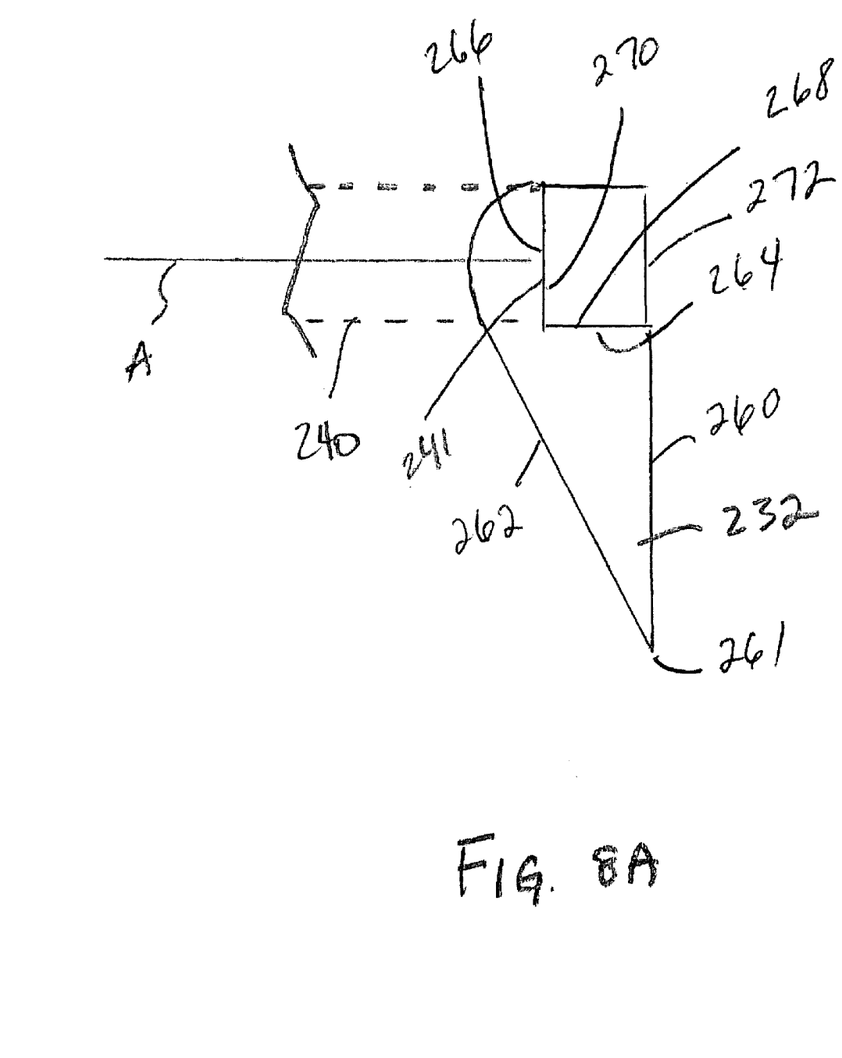
FIG. 8A is a side view of the transverse beam and tine configuration of the defacer of FIG. 8.

As further shown in FIG. 8, in one embodiment, braces 231 are connected, e.g., by welding, between the ends of transverse beam 230 and beams 240, 242 to provide additional support for transverse beam 230. As shown in FIGS. 8 and 8A, unlike defacer 14 of FIG. 2, the front end surface 241 of elongate beam 240 is formed at an angle of about 90 degrees relative to axis A of beam 240 (beam 242 being similarly configured). Transverse beam 230 is connected to the respective front end surfaces of beams 240, 242 by welding. Tines 232 are each comprised of a planar metal plate having a generally linear front edge 260 and generally linear rear edge 262 which extends from an end 261 of front edge 260 at an angle relative to front edge 260. An upper portion of the metal plate forming each tine 232 is configured with edge portions 264 and 266 that are complimentary to and mate with the lower and rear surfaces 268, 270, respectively of transverse beam 230. Tines 232 are connected to transverse beam 230 along edge portions 264 and 266 by welding. As shown, the front edge 260 of each tine 232 is generally aligned and parallel with the front surface 272 of transverse beam 230 and perpendicular to axis A of beams 240, 242, although this alignment is not critical and other orientations of front edge 260 may employed. The rear edge 262 extends at an angle relative to front surface 272, e.g., an angle of less than 90 degrees. Relative to axis A of beam 240, the rear edge 262 extends at an obtuse angle. In one embodiment, rear edge 262 extends at an angle of about 45 degrees relative to front surface 272. As such, tines 232 of transverse beam 230 collectively provide a wedge-like function to move a layer of silage away from the silage pile when the front end 226 of defacer 200 is maneuvered down the exposed face of a silage pile with the tines generally vertically oriented and engaging the silage pile.

Embodiments described above provide an easy to maintain silage pile defacer having no moving parts which does not degrade the silage in the process of remove a face layer of silage. The silage pile defacer includes a quick attach mount compatible with quick hitch couplers used by farm and other implements. The quick attach mount of the silage pile defacer is configured to rest on the ground when the defacer is not is use in a manner that elevates tines of the defacer off of the ground.

Although specific embodiments have been illustrated and described, it will be appreciated by those of ordinary skill in the art that a variety of alternative and/or equivalent implementations may be substituted for the specific embodiments shown and/or described without departing from the scope of the present invention. This application is intended to cover any adaptations or variations of the specific exemplary embodiments of the above-described silage pile deface. Therefore, it is intended that this invention be limited only by the claims and equivalents of the claims.

What is claimed is:

1. A silage pile defacer comprising:
   a frame having a first end and a second end opposite the first end, the first end of the frame comprising means to reversible couple the frame with a quick connect lift arm mechanism of a tractor, the frame having a longitudinal axis;
   a transverse beam coupled to the second end of the frame, the transverse beam having a length, a front surface, an upper surface and a lower surface; and
   a plurality of metal plates spaced along the length of the transverse beam, each metal plate having a length defined by a first end and a second end opposite the first end, wherein the first end of each metal plate is connected to the transverse beam, the second end of each metal plate being spaced from the lower surface of the transverse beam.

2. The silage pile defacer of claim 1, wherein the first end of each metal plate has a width greater than that of the second end of each metal plate.

3. The silage pile defacer of claim 2 wherein each metal plate comprises a front edge and a rear edge, the front and rear edges converging together at the second end of each metal plate.

4. The silage pile defacer of claim 1, wherein each metal plate has a front edge and a rear edge, the front edge being generally parallel with the front surface of the transverse beam, the rear edge extending at an angle of less than 90 degrees relative to the front edge.

5. The silage pile defacer of claim 4, wherein the rear edge extends at an angle of about 45 degrees relative to the front edge.

6. The silage pile defacer of claim 1 wherein the transverse beam further comprises a rear surface, each metal plate configured to be connected to the rear and lower surfaces of the transverse beam.

7. A silage pile defacer comprising:
   a frame having a first end and a second end opposite the first end, the first end of the frame configured to couple with a lift arm mechanism of a tractor;
   a transverse beam coupled to the second end of the frame, the transverse beam having a length, an upper surface and a lower surface; and
   a plurality of tines spaced along the length of the transverse beam, each tine of the plurality of tines have a length defined by a first end and a second end, an end portion of each tine adjacent the first end being connected to the transverse beam such that the second end extends away from the lower surface of the transverse beam.

8. The silage pile defacer of claim 7 wherein the length of each tine of the plurality of tines is about 32 inches.

9. The silage pile defacer of claim 7 wherein each tine of the plurality of tines is spaced apart from an immediately adjacent tine by a distance of about 10.5 inches.

* * * * *